United States Patent

Nishikawa et al.

[11] Patent Number: 4,937,426
[45] Date of Patent: Jun. 26, 1990

[54] AUTOMATIC GROOVE TRACING METHOD FOR AN ARC WELDING ROBOT

[75] Inventors: Seigo Nishikawa; Shinji Okumura; Tadayuki Amano; Kazutoshi Hata, all of Kitakyushu, Japan

[73] Assignee: Kabushiki Kaisha Yaskawa Denki Seisakusho, Fukuoka, Japan

[21] Appl. No.: 291,304

[22] Filed: Dec. 28, 1988

[30] Foreign Application Priority Data

Dec. 28, 1987 [JP] Japan .................. 62-329720
Feb. 19, 1988 [JP] Japan .................. 63-38074

[51] Int. Cl.$^5$ ............................................. B23K 9/127
[52] U.S. Cl. ........................... 219/124.34; 219/125.12
[58] Field of Search ................. 219/124.34, 125.12, 219/124.22

[56] References Cited

U.S. PATENT DOCUMENTS 4,556,777 12/1985 Sarugaku et al. .............. 219/125.12
4,587,398 5/1986 Saragaku et al. .............. 219/125.12
4,704,513 11/1987 Sugitani et al. ............... 219/125.12

*Primary Examiner*—Clifford C. Shaw
*Attorney, Agent, or Firm*—Wenderoth, Lind & Ponack

[57] ABSTRACT

A method is disclosed for correcting the travel path of an oscillating robotic welding torch tracing a groove line defined by an upper and lower plate. According to one aspect of the invention, a first integrated value of the welding current at the center of oscillation is compared with second and third integrated values of the welding current at opposite first and second ends of the oscillation, respectively. The travel path of the robotic welding torches adjusted towards the second end of oscillation when the second and third integrated values of the welding current are smaller than the first integrated value of the welding current. According to another aspect of the present invention, a first integrated value of the welding current at the second end of oscillation of a previous oscillation torch is compared with a second integrated value of the welding current at the second end of oscillation of a subsequent oscillation. The travel path of the robotic welding torch is adjusted towards the second end of oscillation when the difference between the first and second integrated value exceeds a predetermined allowable value. According to yet another aspect of the present invention, an integrated value of the welding current at the second end of oscillation is compared with an average integrated value of the second end of oscillation. The average integrated value at the second end of oscillation being a value resulting when the robotic vehicle correctly traverses the groove line. The travel path is adjusted towards the second end of oscillation when the difference between the first and average integrated values exceeds a predetermined allowable deviation value.

5 Claims, 6 Drawing Sheets

AUTOMATIC GROOVE TRACING METHOD FOR AN ARC WELDING ROBOT

BACKGROUND OF THE INVENTION AND PRIOR ART

The present invention relates to an automatic tracing method for a welding torch in a lap joint welding operation of a consumable electrode type arc welding robot.

In the past, as a method for automatically controlling the lap joint welding of a welding torch 4 of a consumable electrode type arc welding robot as shown in FIG. 1, that is, in which an upper plate (web) 2 laps on a lower plate (flange) 3 to define a weld groove line 6, there has been proposed an automatic control method which utilizes the fact that a weld current value varies according to a distance between the welding torch 4 and the material to be welded.

The tracing of the weld groove line 6 according to the aforesaid method is accomplished by oscillating the welding torch widthwise relative the length of the groove, integrating weld currents at both ends of the oscillation and comparing the thus integrated current values to determine if they are equal to each other, and moving the oscillation center 5 of the welding torch 4 towards the oscillation end having the smaller of the integrated current values if the values are unequal.

Further, tracing relative the vertical direction of the weld groove line 6 is accomplished by comparing an average value of the integrated current values of the weld current with an adequate preset current value, and if the average weld current value is larger than the preset current value, the distance between the welding torch and the material to be welded is deemed to be too short and therefore an upward correction is made, whereas if the average integrated value of the weld current is smaller than the preset current value, the distance between the welding torch and the material to be welded is deemed to be too long and therefore, a downward correction is made.

However, in the above method of comparing the integrated current values at both oscillation ends, then the lap joint welding is as shown in FIG. 1, the wall 2 of the upper plate (web) 1 is relatively small, and the wall 2 may become inclined or melted at the lower plate (flange) 3 side to lose a corner thereof. When the oscillation center 5 of the welding torch 4 is deviated from the weld groove line 6 towards the upper plate 1, the projected length of a wire 7 on the upper plate 1 side of oscillation is longer than the projected length of a wire on the lower plate 3 side of oscillation as indicated by the distance "m". Therefore, the integrated current value on the upper plate 1 side of oscillation is smaller than the integrated current value on the lower plate 3 side of oscillation, resulting in the issuance of a command for correction towards the upper plate 1 side. As a result, an opposite correction is made in that the oscillation center should be corrected towards the lower plate 3 side to effect the automatic tracing along the weld groove line 6, resulting in an increase in the deviation from the weld groove line 6 towards the upper plate 1.

When once departed towards the upper plate 1, the length of the wire 7 at the upper plate 1 side of oscillation necessarily becomes long as shown in FIG. 2, and therefore, the weld integrated current value at the oscillation end of the upper plate 1 is small. As a consequence, a further correction towards the upper plate 1 is effected, and the oscillation center 5 continues to be moved away from the weld groove line 6.

As a result, an operating state results in which the center of oscillation departs from the weld line in the automatic tracing method. Due to the occurrence of this phenomenon, the wall 2 of the material to be welded must be high, as in a T-shape fillet, to accomplish excellent automatic tracing, but if the material to be welded has a wall 2 which is liable to be melted, as in a lap fillet, the use thereof is difficult.

SUMMARY OF THE INVENTION

The present invention has been achieved in view of the above-described problem. An object of the present invention is to provide an automatic tracing method for a welding torch which can, in a lap fillet welding, prevent a departure towards the upper plate or lower plate without the provision of a special control device.

For achieving the aforesaid object, the present invention provides an arrangement wherein integrated current values at both ends of oscillation are compared with an integrated current value of an oscillating center whereby a deviation towards the upper plate is detected. Alternately, frequency components of a signal having twice the oscillation frequency are extracted and a current phase thereof is detected to thereby detect a deviation towards the upper plate. Then, correction towards the lower plate is applied irrespective of the result of comparison between the integrated current values at both ends of oscillation to prevent a departure toward the upper plate.

According to another embodiment of the invention, a detected weld current is smoothed by a low pass filter having a cutoff frequency equal to a frequency of oscillation, and when the weld current at the oscillation end of the lower plate 1 side significantly increases, correction towards the lower plate is effected irrespective of the comparison between the integrated current values at both ends of oscillation.

DESCRIPTION OF THE PREFERRED EMBODIMENTS

Embodiments for achieving the object of the present invention will now be described.

The embodiment described hereinafter is a different control method from that using in the conventional device, and for the purpose of better understanding, a principle of the present invention will be first explained.

Figure 3A:
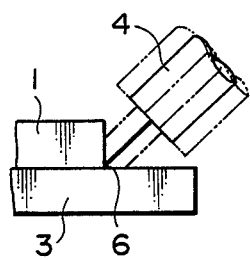
FIG. 3A is a schematic view where an oscillating center traces a weld groove line.
Figure 3B:
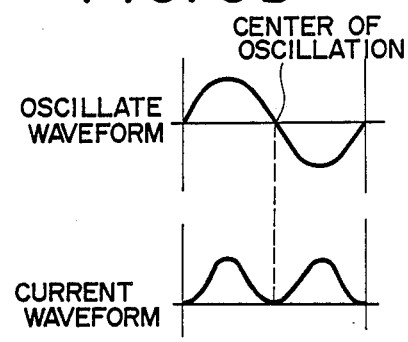
FIG. 3B shows a waveform of a weld current relative to FIG. 3A.

FIG. 3A shows the operating state wherein a torch 4 oscillates along a weld groove line 6, and FIG. 3B schematically shows a waveform of a weld current relative the oscillating torch 4. In this operating state, current values at both ends of oscillation are high, and the current value at the center of oscillation is small in comparison with the current values at both ends of oscillation.

Figure 4A:
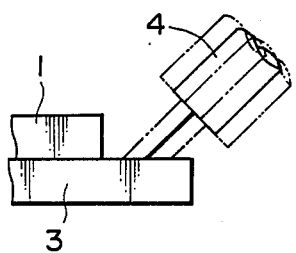
FIG. 4A is a schematic view where an oscillating center is considerably deviated towards the lower plate.
Figure 4B:
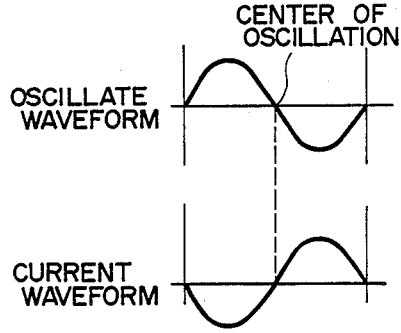
FIG. 4B shows a waveform of a weld current relative to FIG. 4A.

FIG. 4A shows the operating state in which the torch 4 oscillates along a path that is considerably deviated toward the lower plate 3, and FIG. 4B shows a waveform of a weld current in this operating state. As shown in FIG. 4B, the weld current at the oscillation end of the lower plate 3 side is largest.

As will be understood from viewing FIG. 3B and FIG. 4B, one of the current values at both ends of oscillation is necessarily larger than the current value at the oscillating center.

Figure 5A:
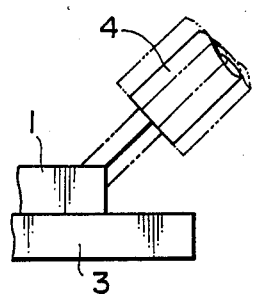
FIG. 5A is a schematic view where an oscillating center is slightly deviated towards the upper plate.
Figure 5B:
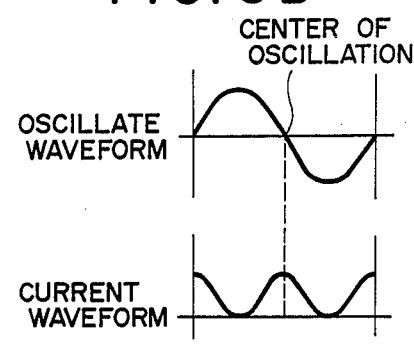
FIG. 5B shows a waveform of a weld current relative to FIG. 5A.

However, when a deviation towards the upper plate 2 occurs and the center position of oscillation is near the edge portion on the upper plate 1 as shown in FIG. 5A, the the current value at the center of oscillation is larger than the current values at both ends of oscillation, resulting in the characteristic current waveform shown in FIG. 5B.

Embodiment 1

A first embodiment is based on the knowledge that by detecting a specific current waveform, a deviation toward the upper plate 1 side can be recognized, and a correction applied towards the lower plate 3 irrespective of a comparison between integrated current values at both ends of oscillation.

Figure 6B:
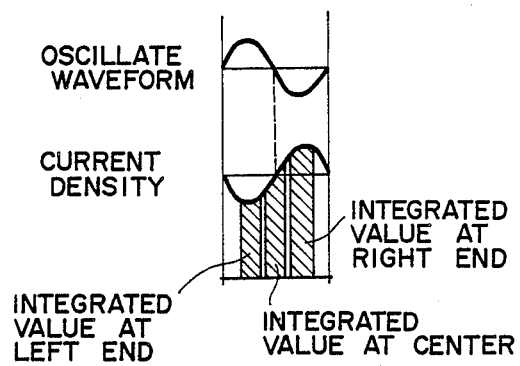
FIG. 6B shows a waveform of a weld current relative to FIG. 6A.
Figure 6A:
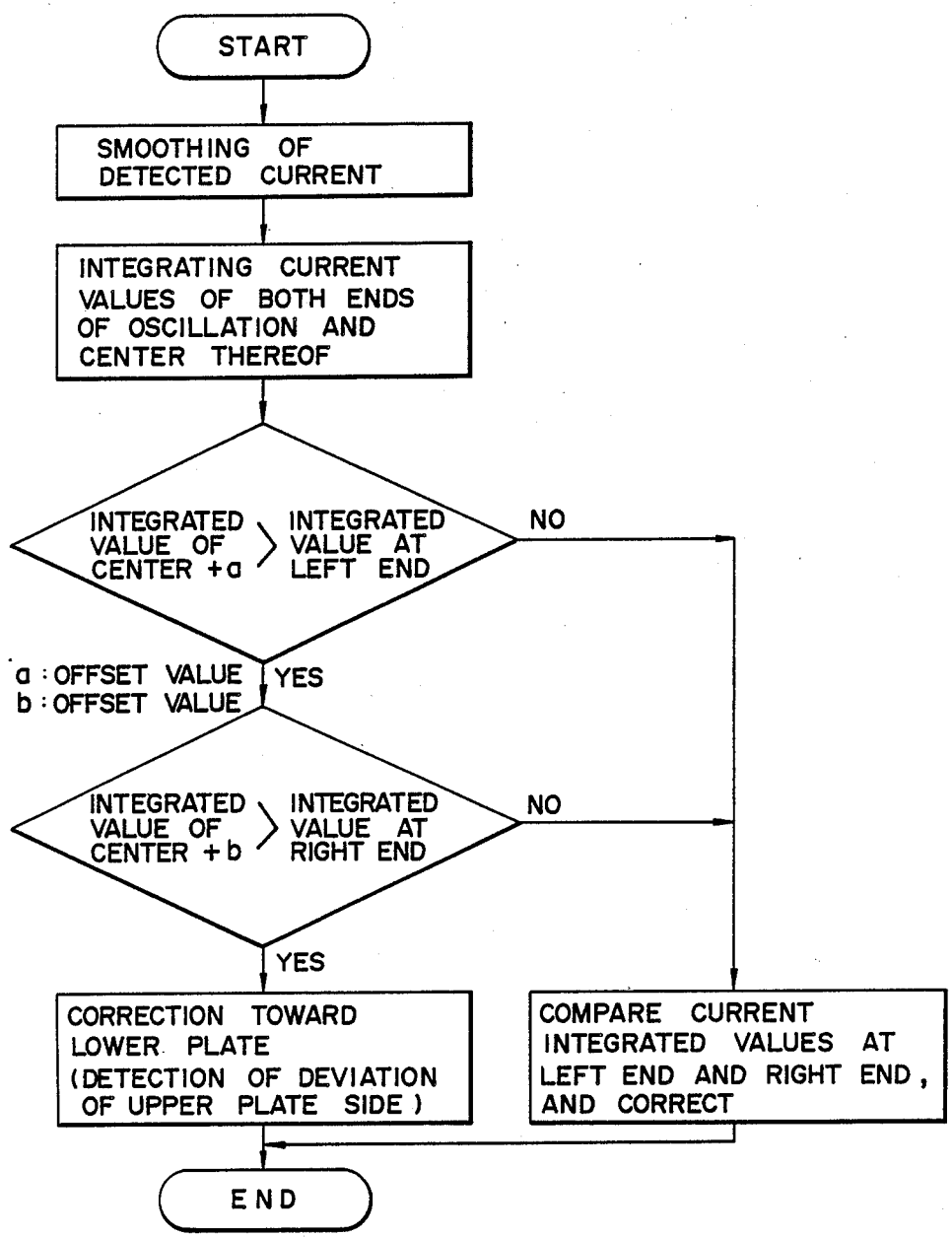
FIG. 6A is a control flow chart for detecting a deviation towards the upper plate by comparing integrated current values at both ends of oscillation with an integrated current value at a center of oscillation.

In the first embodiment, the welding torch is controlled as shown in the flow chart of FIG. 6A, and the schematic of FIG. 6B, to prevent a departure towards the upper plate 1.

In the aforesaid first embodiment, in the case where the weld integrated current value in the oscillating center is larger than the weld integrated current values at both ends of oscillation, the operating state in which the welding torch 4 has drifted into upper plate 1 can be detected.

However, depending on the specific shape of a coupling of a material to be welded, the quality of material and the welding conditions, even in the operating state in which the edge of the upper plate 1 has melted and the welding torch 4 has run onto the upper plate 1, the weld integrated current value in the oscillating center may sometimes not be larger than the weld integrated current values at both ends of oscillation.

Therefore, offset values (a and b in the flow chart of FIG. 6A) are applied to the weld integrated current value of the oscillating center, and then the weld integrated values of oscillation are compared, whereby even in the operating state wherein the edge has melted, the running of the welding torch 4 onto the upper plate 1 can be detected.

It is also possible to adjust the set amount of the offset to detect the operating state in which the welding torch 4 has slightly deviated toward the upper plate 1.

The offsets a and b have values which vary according to the welding conditions, and which can be obtained by experiment.

Embodiment 2

A second embodiment is directed to a method for detecting and correcting a deviation towards the upper plate 1 according to a current phase during oscillation.

Figure 7B:
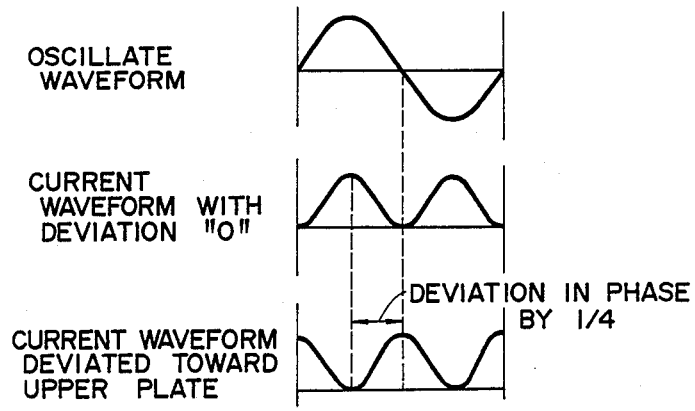
FIG. 7B shows a waveform of a weld current relative to FIG. 7A.
Figure 7A:
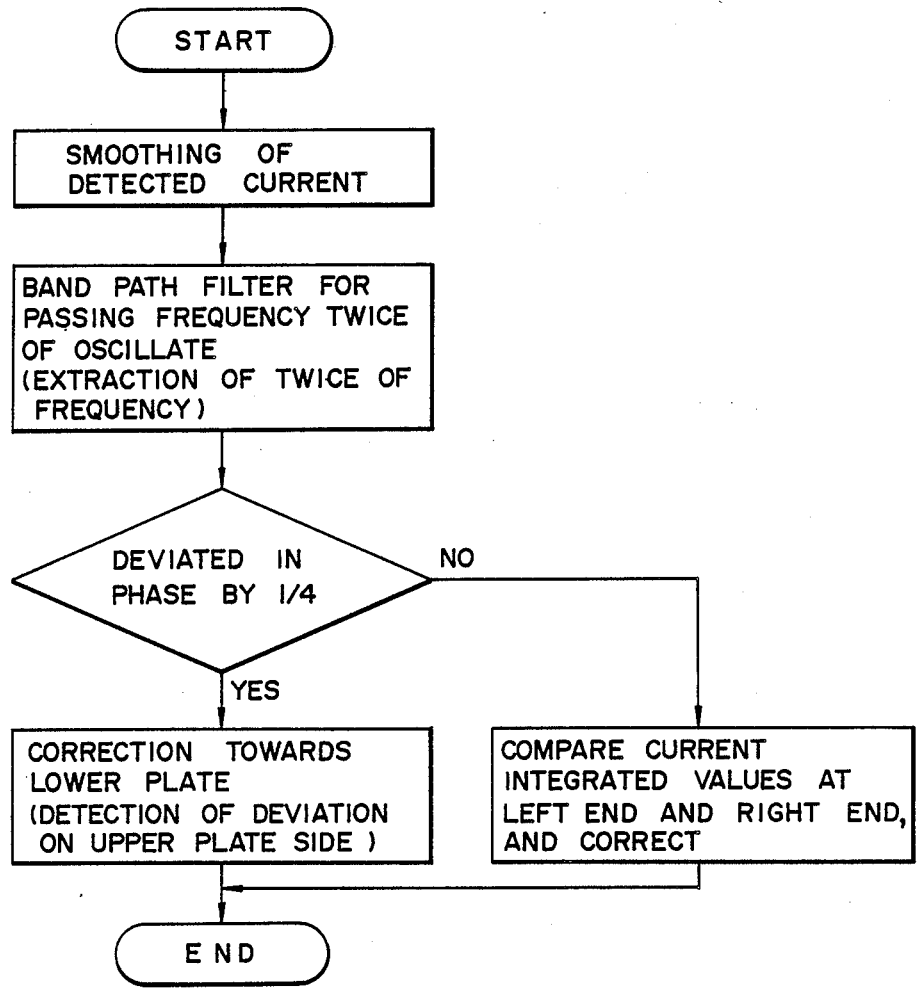
FIG. 7A is a control flow chart for detecting a deviation towards the upper plate by extracting components of a signal having a frequency which is twice the oscillation frequency.

FIG. 7A shows a control flow chart of the second embodiment. FIG. 7B shows schematic waveforms for a better understanding of the operation of the second embodiment.

In the second embodiment, a band pass filter is used for passing a signal having a frequency which is twice the oscillation frequency of the welding torch 4, and components of this signal are extracted. The amplitude of the signal having the frequency which is twice the oscillation frequency is largest when no deviation is present and becomes smaller as the welding torch 4 is moved from the weld groove line 6. While the amplitude varies as described above, the phase of the signal remains constant.

However, as the welding torch 4 deviates towards the upper plate 1, the phase of the current signal having twice the frequency of the oscillation frequency is deviated by a ¼ wavelength when the center of the oscillation is directed on the edge of the upper plate 1 as shown in FIG. 5A.

Therefore, this change in the phase the current signal can be detected to thereby recognize the state of the welding torch 4 tending to run onto the upper plate 1. In the case where this phase deviation is detected, and recognition is made of a drifting towards the upper plate 1, a correction is applied towards the lower plate 3 regardless of a comparison of the integrated current values at both ends of oscillation, and a departure towards the upper plate 1 can thus be prevented.

Among the two embodiments so far described, in the first embodiment, a comparison is made between the integrated current values at both ends of oscillation and the integrated current value at the oscillating center, and in the second embodiment the current frequency signal components are detected to detect the phase thereof, whereby a deviation towards the upper plate 1 can be detected to prevent a departure towards the upper plate 1.

The conventional method for carrying out the oscillated current detection is relatively inexpensive and free from interference, and is therefore very effective, but in the case where the conventional method is applied to the lap joint welding, once a departure towards the upper plate is made, the torch continues to be moved away from a welding line, therefore posing a problem in terms of a reliability.

According to the above-described embodiments of the present invention, a departure towards the upper plate 1 in a lap joint welding can be prevented by mere software revision, without the use of additional hardware. Thereby, the reliability of sensing of the lap joint welding is improved, as well as the sensing of a lap joint welding having thinner plates.

While two embodiments have been described, modifications and applied examples will be described hereinafter.

According to research carried out by the present inventors, after the weld current has been smoothed by a low pass filter for passing frequencies smaller than the frequency of oscillation, the waveform thereof was verified by experiments, and as a result, it has been found that despite the accomplishment of automatic tracing so that the weld integrated current values at both ends of oscillation are equal to each other as usual, there occurred a phenomenon wherein a difference between the weld integrated current values at both ends of oscillation is abnormally large. It has been found that the phenomenon could be divided into the following three casual types:

(1) where a clearance is present in a groove of a material to be welded;
(2) where a torch tip is greatly deviated from a weld groove line (i.e., where a position of starting welding is greatly deviated, and where a material to be welded is deviated in excess of the ability of automatic tracing);
(3) where a weld bead has run on the upper plate.

In the present invention, attention is directed to the state of moment where the bead has run-on the upper plate 1, which has been mentioned above as phenomenon (3), and the current waveform is analyzed to detect the abnormal phenomenon at a moment when the bead has run on the upper plate 1, thereby preventing the run-on to the upper plate 1.

In order to distinguish the current waveform of phenomenon (3) from the weld current waveforms in the other phenomenons (1) and (2), weld current waveforms for each were analyzed by experimental data.

The results thereof will be described hereinafter.

Figure 8:
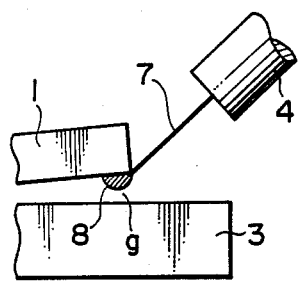
FIG. 8 is a schematic view where a clearance is a present in a weld groove.
Figure 9:
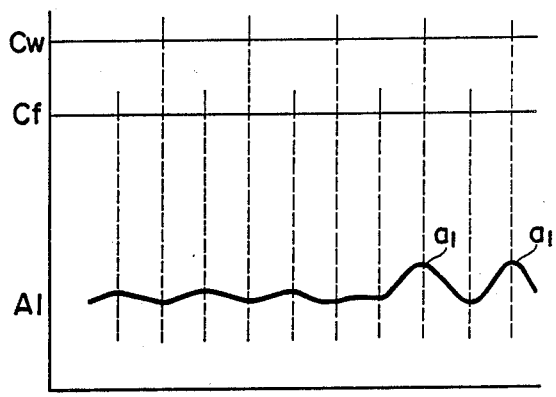
FIG. 9 shows a waveform of a weld current relative to FIG. 8.

(i) Weld current waveform at a groove clearance:

The state where a groove clearance is present is schematically shown in FIG. 8, and a corresponding weld current waveform is shown in FIG. 9.

When a clearance "g" is present in a groove between the upper plate 1 and the lower plate 3, a weld wire 7 is moved into the clearance "g", and as a result, a short-circuit occurs on the side of the upper plate 1 to generate an abnormal current. After the weld, in a portion where a markedly high weld current in generated on the side of the upper plate 1, a large bead 8 is deposited above the clearance. This proves that the short-circuit occurred to generate an abnormal current.

Therefore, in the weld current waveform A1, as shown in FIG. 9, a markedly large weld current waveform $a_1$ appears at a position of signal Cw in synchronism with the end of oscillation towards the upper plate 1, and no abnormal phenomenon appears at a position of signal Cf in synchronism with the end of oscillation towards the lower plate 3.

The characteristic of the weld current waveform when a clearance is present at a weld groove is thus a markedly large weld current generated only when the oscillating end is synchronized with the upper plate 1 side.

(ii) Weld current waveform in the case where the oscillating center is deviated from the weld groove line 6:

In the case wherein the oscillating center 5 is deviated from the start of the welding operation, an abnormal current waveform appears from the beginning, which can be obviously distinguished.

The oscillating center 5 of the welding torch is greatly deviated from the weld groove line 6 more than the ability of tracing in the case where it is deviated towards the lower plate 3.

In the case where the oscillating center 5 is deviated towards the upper plate 1, the same condition results as the state wherein the bead runs onto the upper plate, which will be described later in (iii).

Figure 10:
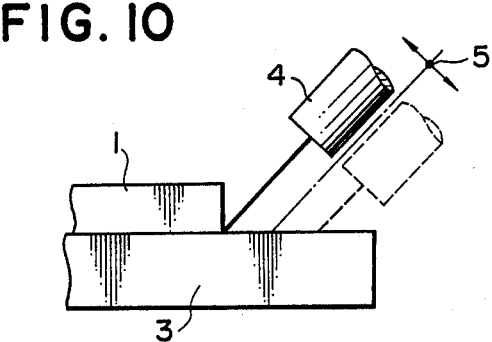
FIG. 10 is a schematic view showing the state in which an oscillating center is deviated towards the lower plate.
Figure 11:
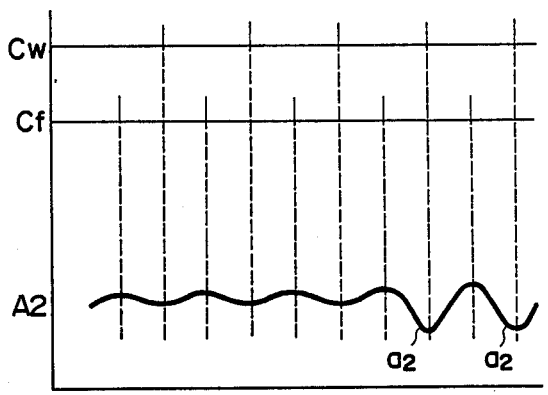
FIG. 11 shows a waveform of a weld current relative to FIG. 10.

In the case where the oscillating center 5 is deviated towards the lower plate 3, the distance between the welding torch and the material to be welded becomes longer towards the upper plate 1 side of oscillation, as shown in FIG. 10. Therefore, there appears a waveform as shown in FIG. 11 wherein a weld current reduces on the upper plate 1 side of oscillation. The characteristic of this weld current waveform A2 is that a markedly lower current value $a_2$ of the weld current waveform occurs at a position of signal Cw in a synchronism with the end of oscillation towards the upper plate 1.

Figure 12:
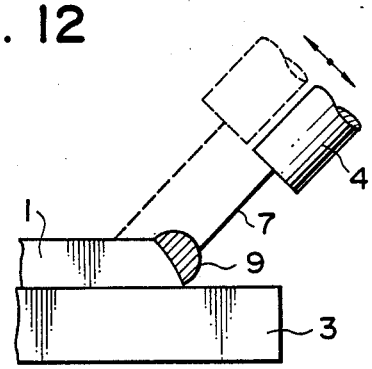
FIG. 12 is a sectional view in which a weld bead has formed on the upper plate.

(iii) Weld current waveform when the oscillating center 5 runs onto the upper plate 1 side:

When the oscillating center 5 of the welding torch is deviated towards the upper plate 1, the weld bead runs onto the upper plate 1, as shown in FIG. 12. Also, when the welding torch 4 is oscillated towards the lower plate 3, a large weld current flows.

In this state, when the torch is oscillated towards the lower plate 3, the weld arc does not reach the surface of the lower plate 3, and an arc is generated in a weld pool formed in the edge. That is, the weld pool 9 formed in the edge of the upper plate 1 becomes a spherical shape due to surface tension, and the welding wire 7 assumes a short-circuited state and a welding current at the end of the lower plate 3 of the oscillation is very large.

Figure 13:
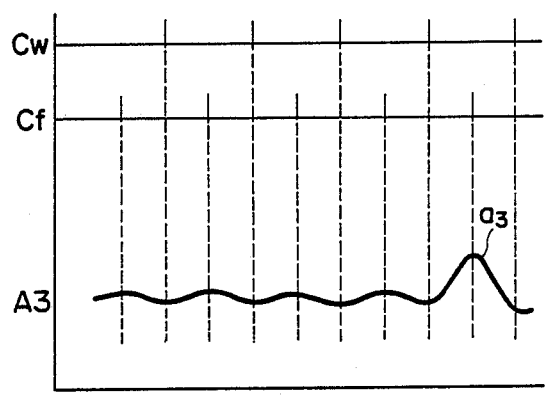
FIG. 13 shows a waveform of a weld current relative to FIG. 12.

FIG. 13 shows a weld current waveform when the center of oscillation runs onto the upper plate 1. The characteristic of the weld current waveform A3 is a large weld current waveform $a_3$ generated at a position of signal Cf in synchronism with the oscillating end of the lower plate 3 side.

The state wherein the edge on the upper plate 1 side is melted into a spherical shape is the characteristic phenomenon generated only when the center of the oscillation runs onto the upper plate 1 side during the lap joint welding. Therefore, the characteristic of the large weld current waveform on the lower plate 3 side can be detected to detect the state of the running-on towards the upper plate 1 side.

Figure 1:
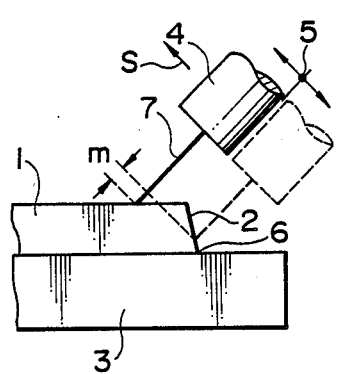
FIG. 1 is a schematic view showing a length of a wire at both ends of oscillation in the case where a center of oscillation towards an upper plate is deviated in a lap joint welding according to a conventional method.
Figure 2:
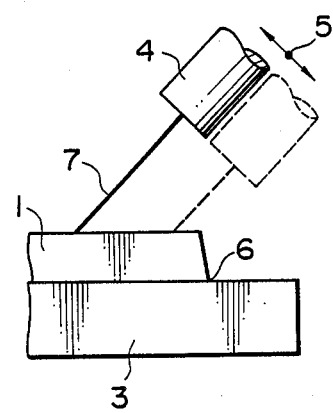
FIG. 2 is a schematic view showing an oscillating state when a welding wire runs onto the upper plate.
Figure 14:
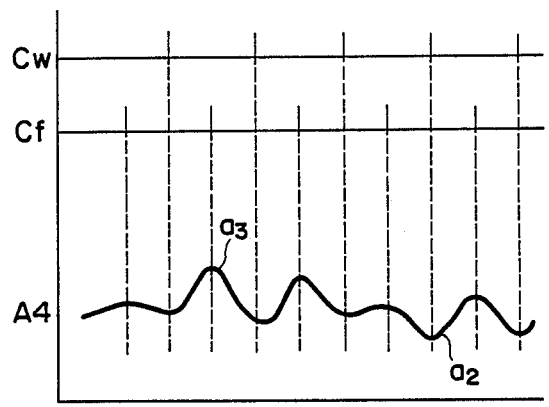
FIG. 14 shows a waveform of a weld current from the beginning of a run-on to the upper plate to the completion of a run-on to the upper plate.

When the wire completely runs onto the upper plate 1, the wire becomes longer towards the upper plate 1 side of oscillation similar to the case shown in FIG. 2, and therefore, a weld current is smaller at a position of signal Cw at the oscillation end towards the upper plate 1 side similar to the weld current waveform of FIG. 11. Accordingly, as shown by the weld current waveform A4 of FIG. 14, from the beginning of the running onto the upper plate 1 side to achievement of complete running-on, a markedly large weld current waveform a3 is generated at a signal cf position at the oscillation end towards the lower plate 3 side as shown in FIG. 4, and thereafter, a small weld current waveform a2 appears at a signal Cw position at the oscillation end towards the upper plate 1 side.

When the phenomenon wherein the weld current waveform becomes large is studied from the cutoff frequency of a low pass filter, the weld current waveform in the state of tracing the groove contains many frequency components twice the frequency of the oscillation frequency, and the weld current waveform in the case where a deviation from a groove is made is a frequency component of the oscillation frequency, as is well known. The the cutoff frequency of the low pass filter is made to be almost the same as the frequency of the oscillation, the frequency component of twice the oscillation frequency of the weld current waveform is cut off by means of a filter in the state of tracing a groove. Therefore, variation in the weld current waveform is small. However, in the state where a deviation from a groove is made, the weld current waveform is a frequency component of the oscillation frequency, and therefore the component is not cut off by the filter and a large weld current waveform is obtained.

As mentioned above, in the normal automatic tracing operation, the abnormal weld current waveform appears in the case where a clearance is present in a weld groove,in the case where a deviation from a groove line was made, and in the case where running onto the upper plate side was made. An abnormally large weld current is generated on the lower plate side only in the case of the running onto the upper plate side, from which characteristic, the running-on state of the upper plate side can be detected.

Accordingly, in the automatic copying accompanied by oscillation, a large weld current on the oscillating lower plate side generated by the running-on towards the upper plate is detected an a correction is applied to the lower plate side irrespective of the comparison between the weld integrated current value of oscillation on the upper plate side 1 and the weld integrated value of oscillation on the lower plate 3 side to thereby prevent a departure towards the upper plate side 1.

An embodiment thereof will be described hereinafter.

The embodiment shown below employs a method for detecting a state wherein a weld current on the lower plate side of oscillation is markedly large in order to detect a state of departure towards the upper plate 1 in the automatic copying operation.

Embodiment 3

In the third embodiment according to the present invention, first, automatic copying is effected in a state free from deviation, and an average deviation $\sigma$ of weld integrated current values detected at the oscillation end towards the lower plate side 1. In this case, the detected weld current is smoothed by a low pass filter for passing a frequency less than that of the oscillation frequency.

In many cases, as will be understood from FIG. 13, a spherical melt pool 9 is suddenly formed in an edge of an upper plate 1, indicating state in which a large short circuit occurs and a markedly high weld current is generated on end of oscillation towards the lower plate 1 side.

Accordingly, a comparison is made between a weld integrated current value Af (N−1) at the oscillation end towards the lower plate side 1 of a previous oscillation and a weld integrated current value Af (N) of a current oscillation, and if a difference {Af (N)−Af (N−1)} therebetween is larger than an allowable deviation $3\sigma$, a departure state is recognized.

Embodiment 4

Since the arc welding robot of this type carries out the automatic tracing, the weld integrated current value on the upper plate side 1 will normally not be very large. Accordingly, in the fourth embodiment, detection is first made of an average value Aw and an average deviation $\sigma$ of weld integrated current values detected at the end of the upper plate 1 side when automatic copying has been carried out in a state free of deviations, and a comparison is made between a weld integrated current value Af (N) at the oscillation end towards the lower plate 1 side and said average value Aw. If {Af (N)−A2} is larger than an allowable deviation $3\sigma$, a departure state is recognized.

The use of an allowable deviation $3\sigma$ in the methods of the third and fourth embodiments is the result of an unevenness of the weld current in the state free from deviations. This value $3\sigma$ is adjusted according to the welding conditions, such as the welding posture and type of electrodes. However, in the normal automatic tracing operation, since the weld integrated current value is uneven in a normal distribution manner, effective detection ban be carried out if an abnormal state is detected with $3\sigma$ as a reference allowable deviation.

When a departure state is recognized by either method as described above, the device is pulled back towards the lower plate 3 by a large correction amount corresponding to two to five times the correction amount of the normal automatic tracing operation, irrespective of the compared value of the integrated current values at both ends of oscillation, to prevent a departure towards the upper plate 1 side.

As described above, in the present invention, the state wherein a weld current at the lower plate 3 side during oscillation is markedly large is detected to effect a correction toward the lower plate 3, whereby a departure toward the upper plate 1 in the lap joint welding can be prevented.

Further, the method for detecting a weld current at the oscillating end to effect tracing is relatively inexpensive and free from interference near a welding torch and is very effective. However, in the case where the aforesaid is applied to a lap joint welding, if a departure towards the upper plate 1 occurrence once, the torch continues to move away from a weld groove line, thus giving rise to a problem of reliability. However, according to the present invention, there are effects in that a departure towards the upper plate can be prevented without us of additional hardware, reliability in sensing of a lap joint welding is improved, and sensing of a lap joint welding for sheets is also possible.

We claim:

1. A method of correcting the travel path of an oscillating robotic welding torch, said robotic welding torch tracing a groove line defined by an upper and lower plate and oscillating laterally relative said groove line to define a center of oscillation and opposite first and second ends of oscillation, said first end of oscillation extending towards the upper plate and said second end of oscillation extending towards the lower plate, said robotic welding torch further having a welding current which has a value related to a distance between the robotic welding torch and the upper and lower plate, said method comprising the steps of:

measuring a first integrated value of the welding current at the center of oscillation of the robotic welding torch;

measuring a second integrated value of the welding current at the first end of oscillation of the robotic welding torch;

measuring a third integrated value of the welding current at the second end of oscillation of the robotic welding torch;

comparing the first integrated value of the welding current with the second and third integrated values of the welding current;

adjusting the travel path of the robotic welding torch in a direction towards the second end of oscillation when the second and third integrated values of the welding current are smaller than the first integrated value of the welding current.

2. A method of correcting the travel path of an oscillating robotic welding torch, said robotic welding torch tracing a groove line defined by an upper and lower plate and oscillating laterally relative said groove line to define a center of oscillation and opposite first and second ends of oscillation, said first end of oscillation extending towards the upper plate and said second end of oscillation extending towards the lower plate, said robotic welding torch further having a welding current which has a value related to a distance between the robotic welding torch and the upper and lower plate, said method comprising the steps of:

passing a signal indicative of the value of the welding current through a low pass filter having a cut-off frequency which is nearly the same as an oscillation frequency of the robotic welding torch;

comparing a first integrated value of the welding current at the second end of oscillation of a previous oscillation of the robotic welding torch with a second integrated value of the welding current at the second end of oscillation of a subsequent oscillation of the robotic welding torch;

adjusting the travel path of the robotic welding torch in a direction towards the second end of oscillation when a difference between the first and second integrated values exceeds a predetermined allowable deviation value.

3. A method as recited in claim 2, wherein the predetermined allowable deviation value substantially equals three times an average deviation value, the average deviation value equalling an average deviation of the welding current at the second end of oscillation when the robotic welding torch correctly traces along the groove line.

4. A method of correcting the travel path of an oscillating robotic welding torch, said robotic welding torch tracing a groove line defined by an upper and lower plate and oscillating laterally relative said groove line to define a center of oscillation and opposite first and second ends of oscillation, said first end of oscillation extending towards the upper plate and said second end of oscillation extending towards the lower plate, said robotic welding torch further having a welding current which has a value related to a distance between the robotic welding torch and the upper and lower plate, said method comprising the steps of:

passing a signal indicative of the value of the welding current through a low pass filter having a cut-off frequency which is nearly the same as an oscillation frequency of the robotic welding torch;

comparing a first integrated value of the welding current at the second end of oscillation of the robotic welding torch with a second integrated value, said second integrated value being an average integrated value of the welding current at the second end of oscillation when the robotic welding torch correctly traces along the groove line;

adjusting the travel path of the robotic welding torch in a direction towards the second end of oscillation when a difference between the first and second integrated values exceeds a predetermined allowable deviation value.

5. A method as recited in claim 4, wherein the predetermined allowable deviation value substantially equals three times an average deviation value, the average deviation value equalling an average deviation of the welding current at the second end of oscillation when the robotic welding torch correctly traces along the groove line.

* * * * *